May 30, 1967 L. S. GOURNAY 3,322,231
METHODS AND SYSTEMS UTILIZING LASERS FOR
GENERATING SEISMIC ENERGY
Filed Dec. 29, 1964 2 Sheets-Sheet 1

May 30, 1967
L. S. GOURNAY
3,322,231
METHODS AND SYSTEMS UTILIZING LASERS FOR GENERATING SEISMIC ENERGY
Filed Dec. 29, 1964
2 Sheets-Sheet 2
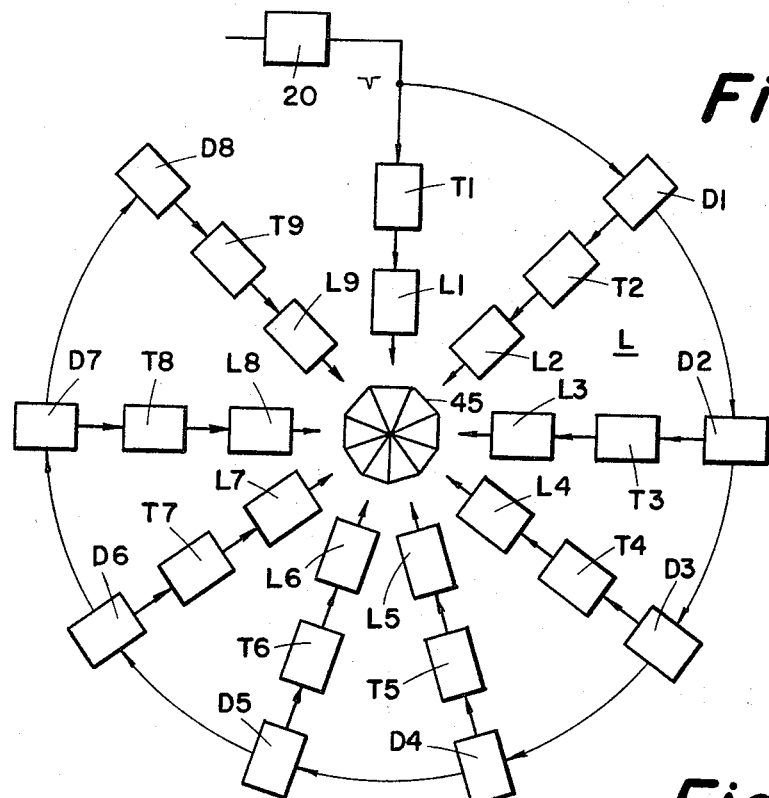
Fig. 4
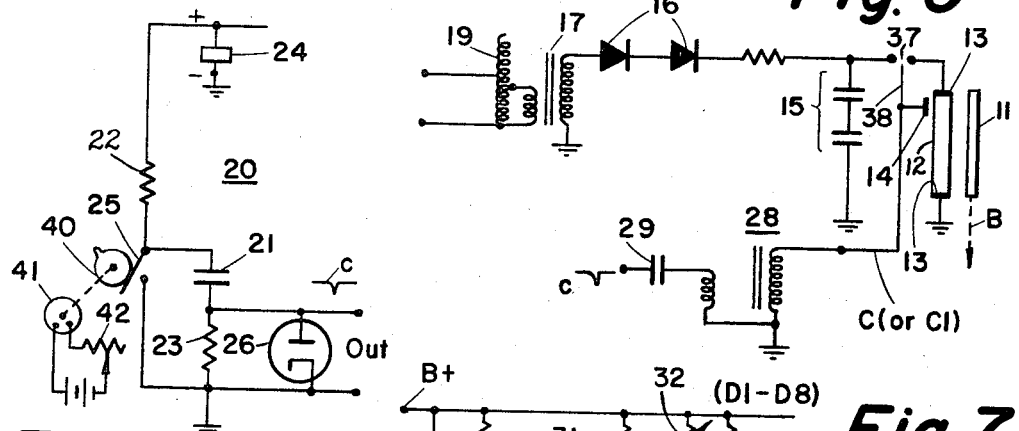
Fig. 5
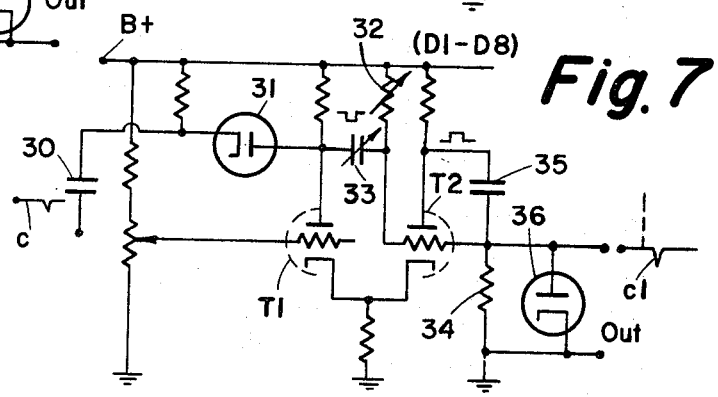
Fig. 6
Fig. 7

United States Patent Office 3,322,231
Patented May 30, 1967

3,322,231
METHODS AND SYSTEMS UTILIZING LASERS
FOR GENERATING SEISMIC ENERGY
Luke S. Gournay, Dallas, Tex., assignor to Mobil Oil
Corporation, a corporation of New York
Filed Dec. 29, 1964, Ser. No. 421,814
11 Claims. (Cl. 181—.5)

This invention relates to the generation of seismic energy of controlled frequency and waveform, and particularly concerns the utilization of lasers for production of seismic energy.

In accordance with the present invention, there is produced a series of discrete electromagnetic energy pulses in a time-interval corresponding with the half-period of a desired seismic frequency and the intensity of the successive pulses of the series is varied in correspondence with the half-wave envelope of the desired seismic frequency. More specifically, the aforesaid pulses may be, and preferably are, produced by a laser source whose excitation levels and firing times are programmed to define the half-wave envelope of the desired seismic frequency. Upon application of such sequence of laser-radiation pulses to an elastic medium, for example water or other liquid, the laser energy is converted into a corresponding series of pressure pulses in the medium for propagation as seismic energy of the desired frequency and waveform.

Further in accordance with a specific embodiment of the invention, the laser pulses are applied to a localized area of the medium through a port or window in a massive structure having intimate contact with the liquid so as to enhance the efficiency of conversion of the pulsed laser energy to seismic energy as propagated in the medium.

Further in accordance with another specific embodiment of the invention, the laser-energy source preferably comprises a plurality of lasers each having its own excitation source of appropriate level and the lasers are sequentially fired in predetermined sequence via a series of delay devices in response to a primary firing pulse. When more than one series of laser pulses is to be produced, the interval between successive series may be chosen to be equal to, or suitably greater than, the period of the selected seismic frequency.

The invention further resides in methods of and systems for generating seismic energy of controlled frequency and wave-shape having features of novelty and utility hereinafter described and claimed.

FIG. 1 is illustrative of an energy-pulse sequence for conversion to seismic energy of controlled waveform and fundamental frequency;

FIG. 2 schematically illustrates a preferred arrangement for coupling a pulsed laser source to a body of liquid;

FIG. 4 is exemplary of a preferred system for generating seismic waves by the method exemplified in FIGS. 1 to 3; and FIGS. 5 to 7 schematically illustrate circuitry suitable for components illustrated in block in FIG. 4.

Figure 1:
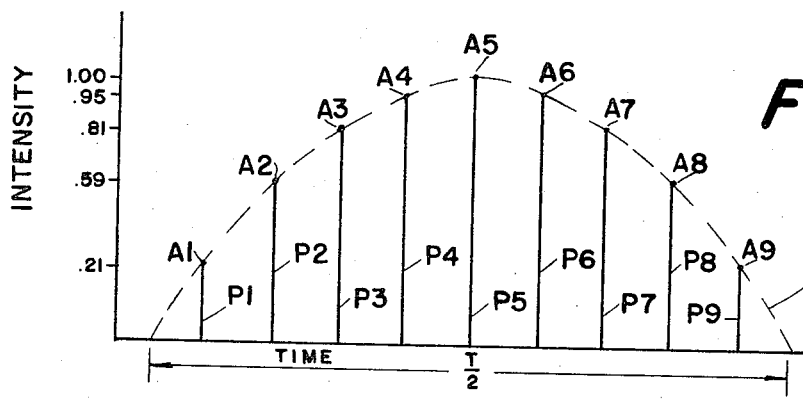
Figure 2:
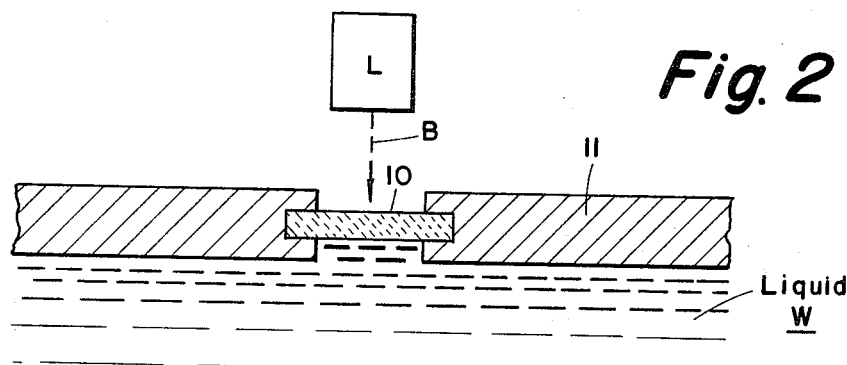

Referring to FIGS. 1 and 2, a source of electromagnetic energy pulses such as a laser source L is repeatedly fired in the time interval $T/2$ corresponding with the half-wave period of a desired seismic frequency F in the seismic-frequency range of about 20 cycles to 100 cycles to produce a sequence of discrete energy pulses P1–P9 whose successively different amplitudes A1–A9 substantially correspond with points of, and so define, a half-wave envelope of a desired seismic frequency F. The brief individual pulses P1–P9 of high-frequency energy have no component in the seismic-frequency range and the number of such pulses in a half-period $T/2$ should be sufficient to form the desired acoustic pulse. Specifically and by way of example, to form an acoustic pulse in water at a basic frequency of about 25 cycles per second, nine laser radiation pulses P1–P9, of about 1 millisecond duration, may be produced at about 2 millisecond intervals with normalized energy levels of the successive pulses respectively, at least approximately 0.21; 0.59; 0.81; 0.95; 1; 0.81; 0.59; 0.21 for a sinusoidal half-wave envelope.

Figure 3:
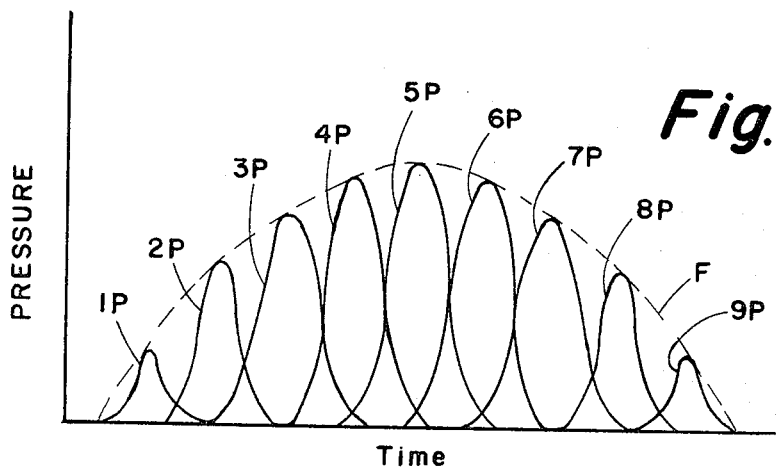
FIG. 3 is illustrative of the pressure-pulse sequence produced in the liquid body of FIG. 2.

The pulsed output beam B of the laser source is directed to a localized area or region of a body of liquid W where the electromagnetic energy of the successive laser-radiation pulses P1 et seq. is converted into pressure pulse IP et seq. in the liquid (FIG. 3). The timing and relative amplitudes of the pressure pulses IP et seq. define a half-wave envelope of the desired seismic frequency F propagated in the water W or other elastic medium. Preferably, and as shown in FIG. 2, the laser beams B are applied to the liquid via a window 10 which is transparent to laser-radiation and is sealed into a surrounding massive plate structure 11 which is in intimate contact with the liquid. In absence of structure 11, reflection of the pressure pulses from the air-water interface would effectively reduce the seismic energy of desired frequency F. The plate structure 11 in effect substitutes for the air interface a material having a high-velocity characteristic which reverses the phase of the otherwise negative-going excursions of the pressure pulses so that essentially all of the converted energy of the laser-pulse sequence forms a positive-going half-wave envelope (FIG. 3) of seismic frequency F. It may here be noted that the conversion efficiency of electromagnetic energy produced by lasers to acoustical energy in water is a function of the electromagnetic energy absorbed per unit volume of water. By concentrating the electromagnetic energy, the conversion can be relatively high compared to acoustic sources, such as dynamite explosions or gas explosions.

For marine applications, the massive plate structure 11 may be the hull of a barge, ship, float or diving bell carrying the laser source L. For land-based operations, the body of liquid W may be in a relatively small cavity in the earth.

The laser source L may be of conversional solid type, such as a ruby or doped glass laser, or of conventional chemical type. In either case, a multi-laser source is preferred because of the relative simplicity and flexibility in programming the firing times and energy levels of the source to obtain the desired waveform and frequency of seismic energy derived from the laser output.

Referring to FIG. 4 as exemplary of the preferred source L, each of the lasers L1 et seq. respectively includes an energy supply and a corresponding one of the trigger devices (T1 et seq.) to produce, when in turn fired, a laser beam. Assuming, for example, that each of the lasers L1 et seq. is of the ruby or doped glass type, pump excitation of the laser rod 11 (FIG. 5) may be provided by a flash lamp 12 having its end electrodes 13, 13 connected across a capacitor bank 15. To fire the laser, a high-voltage negative pulse (c or c1) is applied to a trigger electrode 14 and a gap-ionizing probe 38, whereupon the capacitor bank 15 discharges via spark gap 37 and excites the flash lamp 12. The light so produced excites the laser rod 11 for emission of a high-intensity beam of coherent radiation. In the interval between successive firing pulses F, the capacitor bank 15 is charged, via rectifiers 16, to the peak-output voltage of the high-voltage secondary of power-transformer 17.

For predetermining the different intensities of beams successively produced by lasers L1 et seq. in accordance with a desired half-wave envelope pattern, the charging voltages for the respective condenser banks 15 may be preset to appropriate values as by adjustment of an autotransformer 19 or equivalent in the input circuit of the power transformer 17 for the corresponding laser. The total excitation energy for the laser, of course, depends both upon the voltage applied to, and the total effective capacitance of, the condenser bank 15 of that laser.

To initiate production of a sequence of laser-beam pulses by the multi-laser source L of FIG. 4, the device 20 (FIG. 4) is activated to produce a primary firing pulse applied via the trigger T1 to laser L1 which accordingly emits a laser pulse P1 of intensity A1 (FIG. 1). The primary firing pulse is also applied to a delay device D1 which after a predetermined interval produces a second firing pulse applied via trigger T2 to the second laser L2 which accordingly emits a laser pulse P2 of intensity A2. The second firing pulse is also applied to the next delay device D2 which after a predetermined interval produces a third firing pulse applied via trigger T3 to the third laser L3 and also the third delay device D3. In like manner, each of the remaining lasers L4–L9 is in turn fired each after a time interval provided by a corresponding one of the remainder of the delay devices D4–D8.

The device 20 for producing the primary firing pulse may be a circuit, such as shown in FIG. 6, including a capacitor 21 connected in series with resistors 22, 23 across a D.C. voltage source 24. With the switch 25 open, the capacitor is charged from the source 24 through the current-limiting resistor 22, the output resistor 23 then being effectively shunted by the low forward resistance diode 26. When switch 25 is closed, the capacitor 21 discharges through the output resistor 23 to produce a primary firing pulse of negative polarity which may be applied to the trigger T1 of the first laser L1. Specifically, if laser L1 is of the type shown in FIG. 5, the primary or first firing pulse may be applied to the trigger electrode 14 of the laser flash lamp 12 via the step-up transformer or ignition coil 28 and blocking capacitor 29.

Each of the delay devices D1–D8 of FIG. 4 may be a monostable multivibrator circuit such as shown in FIG. 7. Briefly, when a negative pulse ($c$ or $c1$) from the primary firing circuit or from a preceding delay unit is applied, as by way of capacitor 30 and diode 31 to the anode of tube T1, the anode voltage of tube T2 rises sharply to a maximum value, remains there for a length of time determined by the values of resistor 32 and capacitor 33, and then returns to its original value. The square-wave so generated at the anode of tube T2 is differentiated by RC network 34, 35 and is rectified by diode 36 to produce a negative secondary firing pulse for application to the associated trigger (for example, T2) and the next delay circuit (for example, D2).

Thus, for the multi-laser source L of FIG. 4, the mometary closure of switch 25 results in firing of the lasers in predetermined sequence, at predetermined energy levels, and with predetermined time intervals between the successive firings. In the system of FIG. 4, utilizing the component circuitry of FIGS. 5–7, the sequence of firing is predetermined by the connection pattern between the delay devices; the energy levels for the different lasers are predetermined by the settings of their autotransformer 19 or equivalent; and the time intervals between firings are predetermined by the preselected or preadjusted values of capacitors 33 and resistors 32. Thus, by selection or preadjustment of circuit parameters and pumping levels for the different lasers, it is readily feasible reproducibly to generate a laser-pulse pattern corresponding with the half-wave envelope of any desired seismic frequency and waveform.

For repetitive generation of a shaped series of laser pulses, the primary firing switch 25 may be periodically closed as by a motor-driven cam 40 (FIG. 6). The repetition rate of the pulse series may be varied by changing the speed of the driving motor 41 by a rheostat 42 or equivalent device. In general, the interval between successive closures of switch 25, or equivalent primary firing device, can be programmed to provide any desired repetition rate of the pulse series: for example, repetition rate may be chosen to be greater than twice the travel time to the deepest bed of interest.

It will be understood that for a series L1 et seq. of chemical lasers, their individual outputs may be each predetermined by introduction, prior to firing, of an amount of fuel consistent with the required output energy; that the combustion process for the first laser may be initiated by a primary firing pulse $c$ produced by the circuit 20 of FIG. 6 and stepped up as by a transformer 28 (FIG. 5); and that the combustion process for each of the subsequent lasers is initiated by the output pulses $c1$ of an associated delay circuit (FIG. 7) as stepped up by transformer 28.

A separate window for each laser of FIG. 4 is not necessary: preferably, the beams from all lasers L1 et seq. are directed to a multi-sided mirror 45 and reflected therefrom through a common admittance port or aperture, as provided by the single window 10 of FIG. 2. To that end, each side of the mirror is inclined at 45° to the plane of the lasers. Upon firing, each laser produces electromagnetic energy which is converted to a pressure pulse. The individual pressure pulses add to form an acoustic wave of lower frequency: For example, the pressure pulses P1–P9 of FIG. 3 of amplitudes A1–A9 and occurring at 2-millisecond intervals form an acoustic wave whose fundamental frequency is 25 cycles per second.

What is claimed is:
1. A method of generating seismic energy of controlled frequency and waveform which comprises:
   producing a series of electromagnetic radiation pulses in a time interval corresponding with the half-period of a desired seismic frequency,
   varying the intensity of successive pulses of the series in accordance with the desired half-wave envelope of said seismic frequency, and
   applying the series of electromagnetic radiation pulses to an elastic medium for conversion to a corresponding series of pressure pulses in said medium propagated therein as a half-wave of seismic energy of said desired frequency and waveform.

2. A method of producing seismic energy in a body of liquid which comprises:
   producing a sequence of laser-radiation pulses,
   progressively varying the peak intensity of the successive laser-radiation pulses in substantial correspondence with the half-wave envelope of a desired seismic frequency, and
   applying said sequence of laser-radiation pulses to a localized area of said body of liquid for conversion to a corresponding sequence of seismic-energy pulses in said liquid.

3. A method as in claim 2 in which intervening contraction pulses of said liquid at and adjacent said localized area are reversed in phase for enhancement of the energy-conversion of said applied laser-radiation pulses to half-wave seismic-frequency energy.

4. A method of producing seismic energy in a body of liquid which comprises:
   sequentially firing a series of lasers in a time period corresponding to that of a half-wave of a desired seismic frequency,
   setting the excitation levels of said lasers to produce beam-radiation output levels which in the firing sequence substantially correspond with successive points on the half-wave envelope of said seismic frequency, and
   directing the output beams of said lasers to a localized area of said body of liquid for conversion of the sequence of laser-radiation pulses to a corresponding sequence of seismic-energy pulses in said liquid.

5. A method as in claim 4 in which resulting intervening contraction pulses of said liquid at and adjacent said localized area are effectively reversed in phase for enhancement of the energy-conversion of said applied laser-radiation pulses to half-wave seismic frequency energy.

6. A system for producing seismic-frequency energy in a body of liquid comprising:
   a source of laser radiation,
   means for programming the excitation levels and firing times of said source to produce a series of laser-radiation pulses of intensity and timing definitive of the half-wave envelope of a seismic frequency, and
   means for applying said laser-radiation pulses to said body of liquid for conversion to a corresponding sequence of seismic-energy pulses in said liquid.

7. A system as in claim 6 in which the last-named means comprises massive plate structure in intimate contact with said liquid and having a window transparent to laser-radiation.

8. A system for producing seismic frequency energy in a body of liquid comprising:
   a source of radiation comprising a plurality of lasers respectively having excitation sources of different level,
   means for sequentially triggering said excitation sources for production by said lasers of a series of beam-radiation pulses of intensity and time-spacing definitive of the half-wave envelope of a seismic frequency, and
   reflector means for directing the radiation beams of the lasers to a common localized area of said body of liquid.

9. A system as in claim 8 additionally including:
   a massive plate structure in intimate contact with the liquid and having a window transparent to laser-radiation and located at said localized area.

10. A system for producing seismic energy which comprises:
    a multi-laser source having an output aperture common to the lasers,
    a plurality of exciters for the lasers respectively having different stored-energy levels, and
    means for firing the lasers in a predetermined time sequence including:
       triggers respectively associated with said exciters,
       means for producing a primary firing pulse applied to the first of said triggers, and
       a series of pulse-delay devices respectively associated with the remainder of said triggers, the first of said devices responding to said primary firing pulse to apply a secondary firing pulse to the second trigger and to the next delay device of the series and the remainder of said delay devices in turn responding to the secondary firing pulse produced by the preceding delay device to apply a secondary firing pulse to its associated trigger and the next delay device.

11. A system for producing seismic-frequency energy in a body of liquid comprising:
    a laser system for producing electromagnetic energy,
    means for programming the system to produce electromagnetic radiation energy of predetermined envelope and time duration, and
    means for applying the electromagnetic radiation to the body of liquid for conversion in the liquid to seismic energy whose frequency is a function of the time duration of the envelope of electromagnetic energy.

References Cited
UNITED STATES PATENTS

| | | | |
|---|---|---|---|
| 2,320,248 | 5/1943 | Shimek | 181—.5 |
| 2,923,366 | 2/1960 | Meiners et al. | 181—.5 |
| 3,130,809 | 4/1964 | Flatow | 181—.5 |
| 3,185,250 | 5/1965 | Glazier | 181—.5 |
| 3,259,878 | 7/1966 | Mifsud. | |
| 3,278,753 | 10/1966 | Pitts et al. | 331—94.5 X |

SAMUEL FEINBERG, *Primary Examiner.*

BENJAMIN A. BORCHELT, *Examiner.*

W. KUJAWA, *Assistant Examiner.*